(12) United States Patent
Wu

(10) Patent No.: US 9,467,546 B2
(45) Date of Patent: Oct. 11, 2016

(54) PROJECTION KEYBOARD FOR PORTABLE COMMUNICATION DEVICE

(71) Applicant: Hui-Pin Liang, Changhua (TW)

(72) Inventor: Chuan-Shih Wu, Changhua (TW)

(73) Assignee: SOLID YEAR CO., LTD., Taipei (TW)

( * ) Notice: Subject to any disclaimer, the term of this patent is extended or adjusted under 35 U.S.C. 154(b) by 0 days.

(21) Appl. No.: 14/140,556

(22) Filed: Dec. 26, 2013

(65) Prior Publication Data

US 2015/0189066 A1 Jul. 2, 2015

(51) Int. Cl.
*H04N 5/222* (2006.01)
*H04B 1/38* (2015.01)
*H04M 1/725* (2006.01)
*H04N 9/31* (2006.01)

(52) U.S. Cl.
CPC ....... *H04M 1/72527* (2013.01); *H04N 9/3173* (2013.01)

(58) Field of Classification Search
CPC .. G06F 3/0202; G06F 3/0231; G06F 3/0425; G06F 3/0426; H04N 9/3173
USPC .................. 455/41.1–41.3, 66.1, 90.1–90.3, 455/556.1–559, 566; 345/168; 348/333.1
See application file for complete search history.

(56) References Cited

U.S. PATENT DOCUMENTS

| | | | |
|---|---|---|---|
| 2003/0128190 A1* | 7/2003 | Wilbrink et al. | 345/169 |
| 2006/0256144 A1* | 11/2006 | Chung | G06F 1/1616 715/201 |
| 2008/0311943 A1* | 12/2008 | Earl | 455/509 |
| 2009/0046035 A1* | 2/2009 | Wen | G06F 1/1615 345/3.1 |
| 2010/0085705 A1* | 4/2010 | Yin et al. | 361/679.58 |
| 2010/0265179 A1* | 10/2010 | Ram | 345/163 |
| 2011/0216007 A1* | 9/2011 | Cheng | G06F 3/0488 345/168 |
| 2011/0285633 A1* | 11/2011 | Bathiche et al. | 345/168 |
| 2011/0291935 A1* | 12/2011 | Liu | 345/168 |
| 2012/0291075 A1* | 11/2012 | Pan | 725/81 |
| 2012/0313856 A1* | 12/2012 | Hsieh | 345/168 |
| 2012/0326983 A1* | 12/2012 | Hsieh | G06F 3/0227 345/168 |
| 2013/0023307 A1* | 1/2013 | Zimmerman | G03B 21/28 455/557 |
| 2013/0181905 A1* | 7/2013 | Chiang | G06F 3/0426 345/168 |
| 2014/0013024 A1* | 1/2014 | Lamm et al. | 710/313 |
| 2014/0354441 A1* | 12/2014 | Luna | 340/686.6 |
| 2015/0160738 A1* | 6/2015 | Lithwick | G06F 3/042 345/170 |

\* cited by examiner

*Primary Examiner* — Simon Nguyen
(74) *Attorney, Agent, or Firm* — Jackson IPG PLLC; Demian K. Jackson

(57) ABSTRACT

A projection keyboard for a portable communication device includes a main body having a HDMI input hole; a battery unit disposed in the main body; a connection module connected with the main body and electrically connected with the battery unit, the connection module communicating with an external portable communication device by means of a wireless or wired connection way; a micro projection device pivotally connected to a front central portion of the main body and electrically connected with the battery unit and the HDMI input hole; and a wireless AV receiver electrically connected with the battery unit and the micro projection device. The micro projection device projects the image data to a front screen or on the wall directly like a computer. The present invention has a simple structure and is small in size, without a traditional screen, so the cost is lowered greatly and can be used conveniently.

13 Claims, 4 Drawing Sheets

PROJECTION KEYBOARD FOR PORTABLE COMMUNICATION DEVICE

BACKGROUND OF THE INVENTION

1. Field of the Invention

The present invention relates to a keyboard, and more particularly to a projection keyboard for a portable communication device.

2. Description of the Prior Art

These days, a cell phone and an overhead projector are used widely. However, when in use, both the cell phone and the overhead projector are required to cooperate with each other. The overhead projector occupies much space than the cell phone. It is troublesome to take an overhead projector along. Along with the development of technology, the related research to combine the cell phone and the overhead is developing. The next few years, a cell phone combined with a projector may be developed accordingly.

So far, the use for an integral cell phone and projector is limited to image transmission, without a mechanism for the user to control image and correspond to the user's motion. A conventional laser pen is used for indication, and a mouse is used for switch.

Accordingly, the inventor of the present invention has devoted himself based on his many years of practical experiences to solve this problem.

SUMMARY OF THE INVENTION

The present invention is to provide a projection keyboard for a portable communication device. The projection keyboard comprises a micro projection device to project the image data from the portable communication device (such as a smart phone) to a front screen or on the wall directly by means of a wired or wireless way. The present invention has a simple structure and is small in size, without a traditional screen, so the cost is lowered greatly and can be used conveniently.

The primary object of the present invention is to solve the aforesaid problem and to provide a projection keyboard for a portable communication device. The projection keyboard comprises a main body, a battery unit, a connection module, a micro projection device, and a wireless AV (audio-video) receiver. The main body has a HDMI (High-Definition Multimedia Interface) input hole. The battery unit is disposed in the main body. The connection module is connected with the main body and electrically connected with the battery unit. The connection module communicates with an external portable communication device by means of a wireless or wired connection way. The micro projection device is pivotally connected to a front central portion of the main body and electrically connected with the battery unit and the HDMI input hole. The wireless AV receiver is electrically connected with the battery unit and the micro projection device.

Wherein, the connection module is one of a Bluetooth module and a USB (Universal Serial Bus).

Wherein, the wireless AV receiver is disposed inside the main body, alternatively, the wireless AV receiver is connected outside the main body.

Wherein, the portable communication device with a built-in wireless AV transmission function transmits image data to the micro projection device through the wireless AV receiver by means of the wireless way.

Wherein, the portable communication device without a built-in wireless AV transmission function transmits image data to the micro projection device through the HDMI input hole by means of the wired way.

The projection keyboard for a portable communication device further comprises a HDMI (High-Definition Multimedia Interface) switch device. The wireless AV receiver and the HDMI input hole are electrically connected with the micro projection device through the HDMI switch device.

Wherein, the portable communication device transmits image data to the micro projection device through the HDMI input hole by means of the wired way.

Wherein, the portable communication device transmits image data to the micro projection device through the wireless AV receiver and the HDMI switch device by means of the wireless way.

Wherein, the wireless AV receiver is one of Miracast, airplay Dongle, and smartdongle.

DETAILED DESCRIPTION OF THE PREFERRED EMBODIMENTS

Embodiments of the present invention will now be described, by way of example only, with reference to the accompanying drawings.

Figure 1:
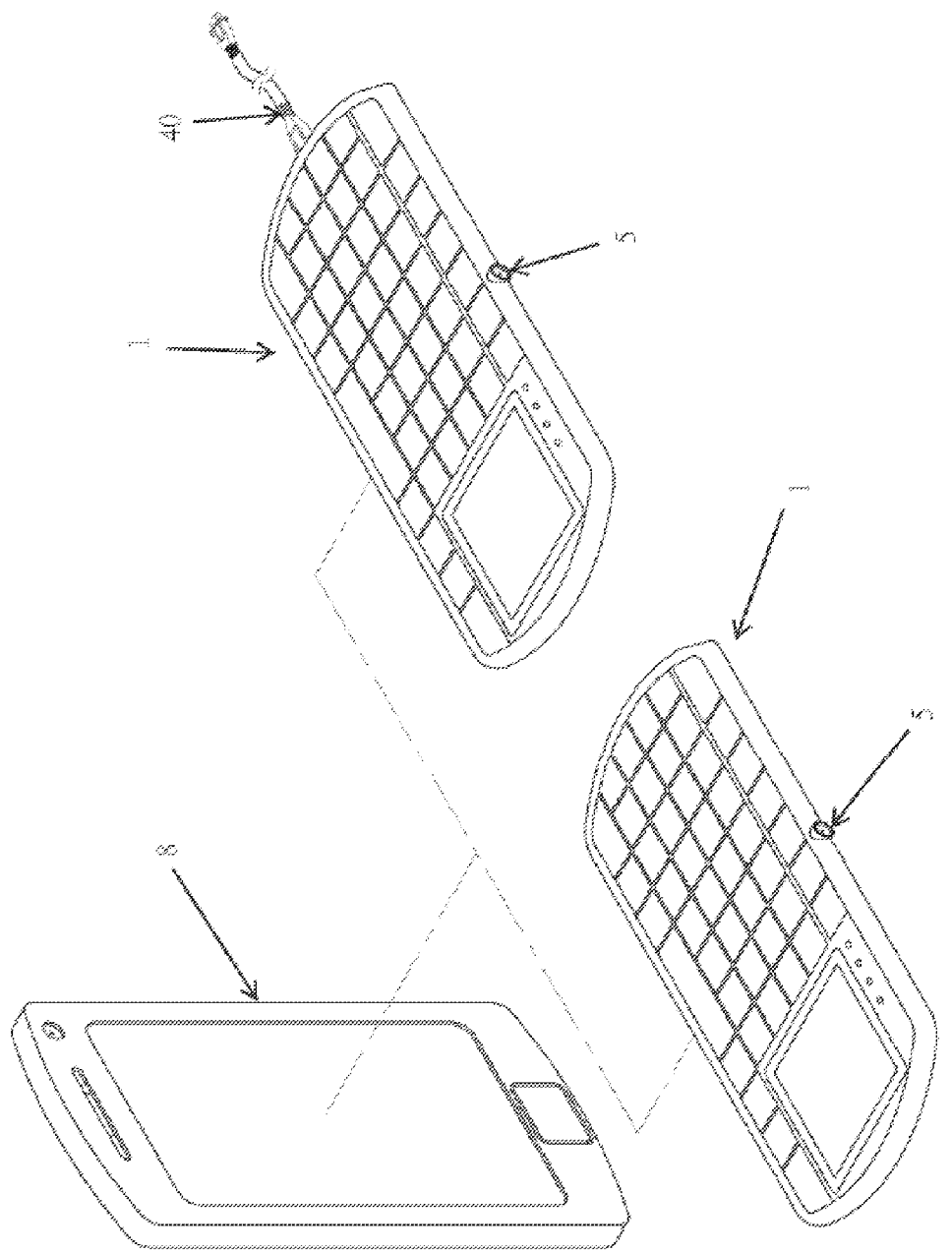
FIG. 1 is a perspective view of the projection keyboard of the portable communication device of the present invention.
Figure 2:
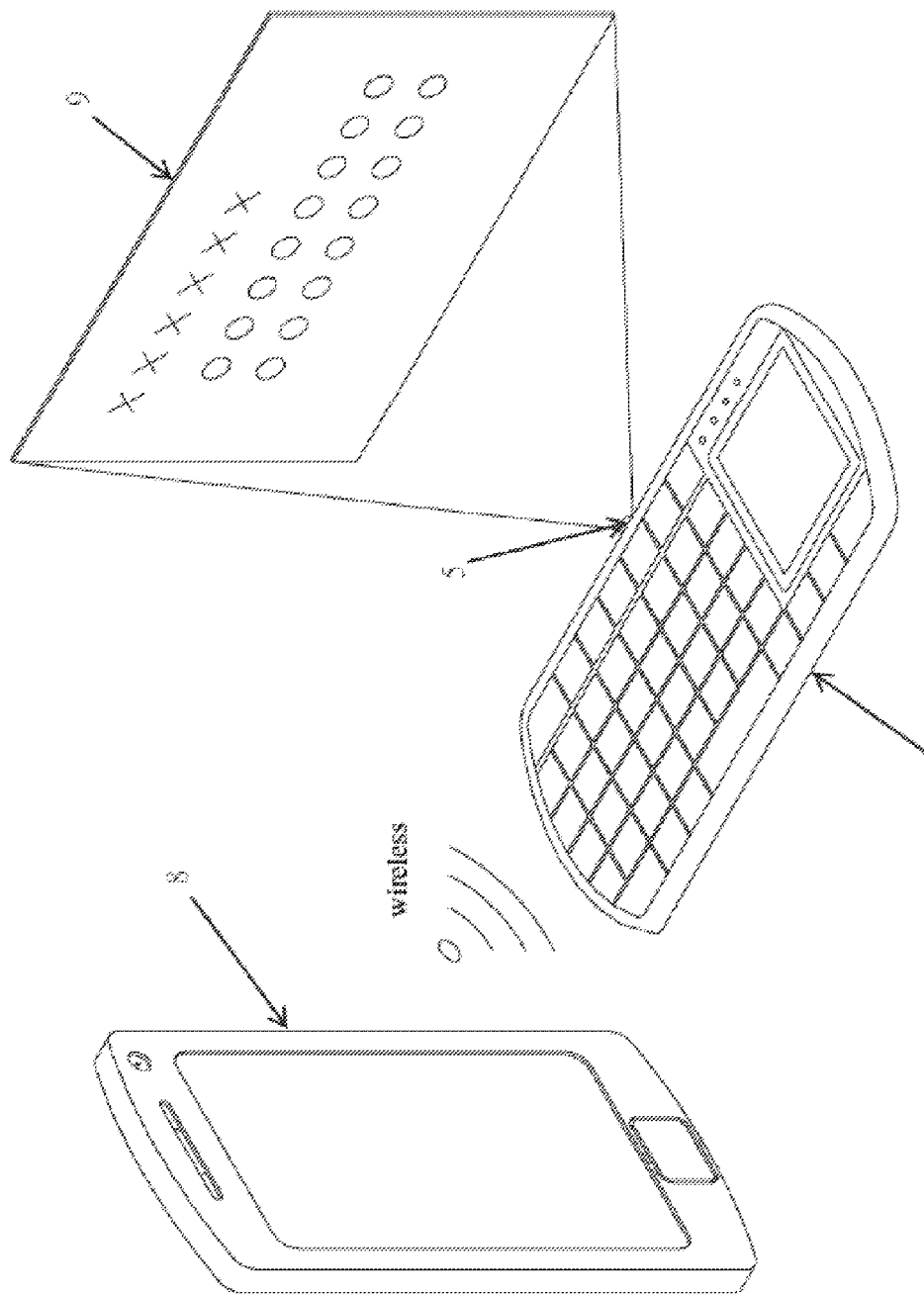
FIG. 2 is a schematic view showing the projection keyboard of the portable communication device of the present invention to project data on a white paper by means of a wireless transmission way.
Figure 3:
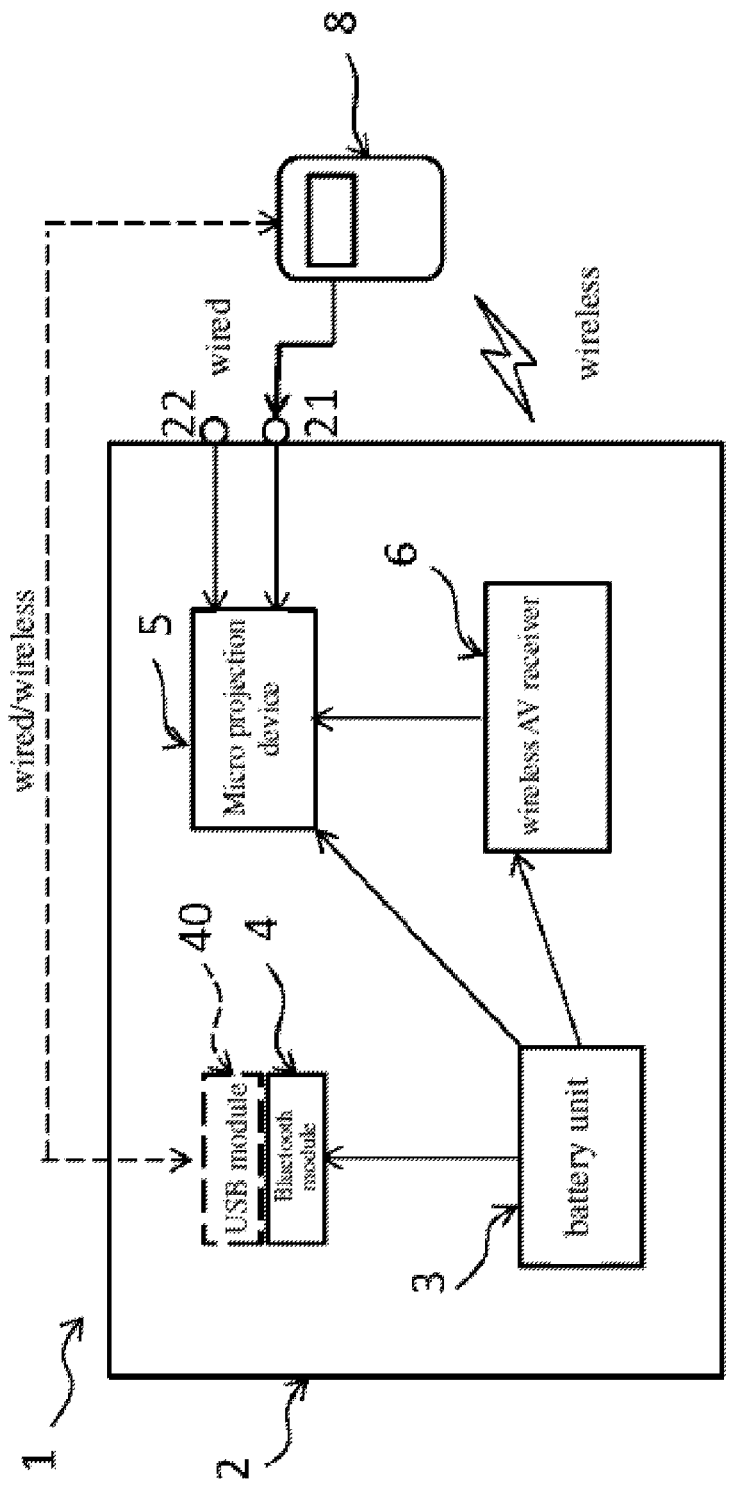
FIG. 3 is a block diagram showing a first embodiment of the projection keyboard of the portable communication device of the present invention.
Figure 4:
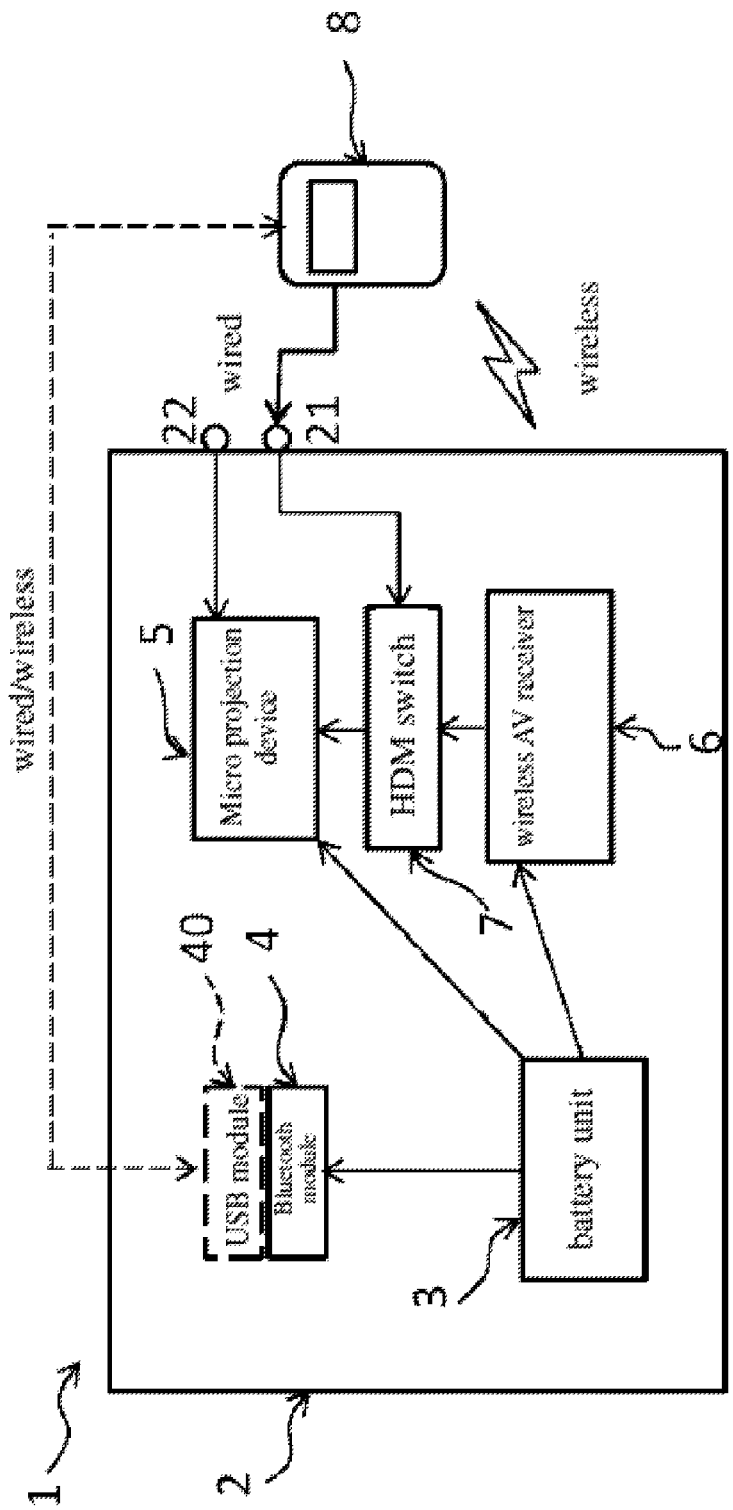
FIG. 4 is a block diagram showing a second embodiment of the projection keyboard of the portable communication device of the present invention.

FIG. 1 is a perspective view of the projection keyboard of the portable communication device of the present invention. FIG. 2 is a schematic view showing the projection keyboard of the portable communication device of the present invention to project data on a white paper by means of a wireless transmission way. FIG. 3 is a block diagram showing a first embodiment of the projection keyboard of the portable communication device of the present invention. FIG. 4 is a block diagram showing a second embodiment of the projection keyboard of the portable communication device of the present invention.

The projection keyboard 1 for a portable communication device of the present invention comprises a main body 2, a battery unit 3, a connection module, a micro projection device 5, and a wireless AV (audio-video) receiver 6.

The main body 2 has a HDMI (High-Definition Multimedia Interface) input hole 21 and an image input hole 22. The image input hole 22 is electrically connected with a micro projection device 5.

The battery unit 3 is disposed in the main body 2.

The connection module is connected with the main body 2 and electrically connected with the battery unit 3. The connection module communicates with an external portable communication device 8 by means of a wireless Bluetooth communication way (namely, the connection module is a Bluetooth module 4) or by means of a wired connection way (namely, the connection module is a USB (Universal Serial Bus) module 40). The portable communication device 8 is a smart phone, but not limited to.

The micro projection device 5 is pivotally connected to a front central portion of the main body 2, and electrically connected with the battery unit 3 and the HDMI input hole 21.

The wireless AV receiver 6 is Miracast, airplay Dongle, smartdongle, or the like, but not limited to. The wireless AV receiver 6 is electrically connected with the battery unit 3 and the micro projection device 5, namely, the wireless AV receiver 6 may be disposed inside the main body 2 or the wireless AV receiver 6 may be connected outside the main body 2.

The projection keyboard 1 for the portable communication device of the present invention further comprises a HDMI (High-Definition Multimedia Interface) switch device 7. The wireless AV receiver 6 and the HDMI input hole 21 are electrically connected with the micro projection device 5 through the HDMI switch device 7.

Therefore, when the portable communication device 8 has a built-in wireless AV transmission function, the image data can be transmitted to the micro projection device 5 through the wireless AV receiver 6 by means of a wireless way, such as WiFi.

When the portable communication device 8 doesn't have a built-in wireless AV transmission function, the image data can be transmitted to the micro projection device 5 through the HDMI input hole 21 by means of a wired way, such as USB.

The micro projection device 5 projects the image data to a front screen 9 or on the wall directly. The present invention has a simple structure and is small in size, without a traditional screen, so the cost is lowered greatly and can be used conveniently.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A projection keyboard for a portable communication device, comprising:
    a main body having a HDMI (High-Definition Multimedia Interface) input hole and an image input hole;
    a battery unit disposed in the main body;
    a connection module connected with the main body and electrically connected with the battery unit, the connection module communicating with an external portable communication device by at least one of a wireless and a wired connection;
    a micro projection device pivotally connected to a front central portion of the main body and electrically connected with the battery unit, the image input hole, and the HDMI input hole; and
    a wireless AV receiver connected with the battery unit and the micro projection device, wherein the micro projection device is inseparable from the main body.

2. The projection keyboard for a portable communication device as claimed in claim 1, wherein the connection module is one of a Bluetooth module and a USB (Universal Serial Bus).

3. The projection keyboard for a portable communication device as claimed in claim 1, wherein the wireless AV receiver is disposed inside the main body.

4. The projection keyboard for a portable communication device as claimed in claim 3, wherein a portable communication device with a built-in wireless AV transmission function transmits image data to the micro projection device through the wireless AV receiver in a wireless connection.

5. The projection keyboard for a portable communication device as claimed in claim 3, wherein the portable communication device without a built-in wireless AV transmission function transmits image data to the micro projection device through the HDMI input hole in a wired connection.

6. The projection keyboard for a portable communication device as claimed in claim 1, wherein the wireless AV receiver is connected outside the main body.

7. The projection keyboard for a portable communication device as claimed in claim 6, wherein the portable communication device with a built-in wireless AV transmission function transmits image data to the micro projection device through the wireless AV receiver in a wireless connection.

8. The projection keyboard for a portable communication device as claimed in claim 6, wherein the portable communication device without a built-in wireless AV transmission function transmits image data to the micro projection device through the HDMI input hole in a wired connection.

9. The projection keyboard for a portable communication device as claimed in claim 1, further comprising a HDMI (High-Definition Multimedia Interface) switch device, the wireless AV receiver and the HDMI input hole being electrically connected with the micro projection device through the HDMI switch device.

10. The projection keyboard for a portable communication device as claimed in claim 9, wherein the portable communication device transmits image data to the micro projection device through the HDMI input hole in a wired connection.

11. The projection keyboard for a portable communication device as claimed in claim 9, wherein the portable communication device transmits image 5 data to the micro projection device through the wireless AV receiver and the HDMI switch device in a wireless connection.

12. The projection keyboard for a portable communication device as claimed in claim 1, wherein the wireless AV receiver is one of Miracast, airplay Dongle, and smartdongle.

13. A projection keyboard and portable communication device system, the system comprising:
    a portable communication device;
    a projection keyboard comprising:
        a main body having a HDMI (High-Definition Multimedia Interface) input hole and an image input hole;
        a battery unit disposed in the main body;
        a connection module connected with the main body and electrically connected with the battery unit, the connection module communicating with an external portable communication device by means of a wireless or wired connection way;
        a micro projection device pivotally connected to a front central portion of the main body and electrically connected with the battery unit, the image input hole, and the HDMI input hole; and
        a wireless AV receiver connected with the battery unit and the micro projection device, wherein the portable communication device transmits image data to the micro projection device.

* * * * *